(12) United States Patent
Nakamura (10) Patent No.: US 6,820,708 B2
(45) Date of Patent: Nov. 23, 2004

(54) COOLING SYSTEM FOR A TRANSMISSION MECHANISM

(75) Inventor: Eiichi Nakamura, Hamamatsu (JP)

(73) Assignee: Suzuki Motor Corporation, Shizuoka-Ken (JP)

( * ) Notice: Subject to any disclaimer, the term of this patent is extended or adjusted under 35 U.S.C. 154(b) by 134 days.

(21) Appl. No.: 10/242,728

(22) Filed: Sep. 13, 2002

(65) Prior Publication Data

US 2003/0066696 A1 Apr. 10, 2003

(30) Foreign Application Priority Data

Sep. 14, 2001 (JP) ........................................ 2001-280033

(51) Int. Cl.$^7$ .............................................. B60K 11/00
(52) U.S. Cl. ....................... 180/68.2; 180/296; 180/309
(58) Field of Search ............................... 180/68.2, 68.3, 180/296, 309, 291, 225, 229, 374

(56) References Cited

U.S. PATENT DOCUMENTS

| | | | | |
|---|---|---|---|---|
| 4,573,550 A | * | 3/1986 | Inomata et al. | 180/296 |
| 4,597,466 A | * | 7/1986 | Yamada | 180/225 |
| 4,637,486 A | * | 1/1987 | Iwai | 180/225 |
| 4,678,054 A | * | 7/1987 | Honda et al. | 180/225 |
| 4,697,665 A | * | 10/1987 | Eastman et al. | 180/230 |
| 4,744,432 A | * | 5/1988 | Shibata et al. | 180/68.1 |
| 4,848,294 A | * | 7/1989 | Yamamoto | 123/198 E |
| 5,012,883 A | * | 5/1991 | Hiramatsu | 180/225 |
| 5,152,255 A | * | 10/1992 | Fukuda | 123/41.33 |
| 5,692,578 A | * | 12/1997 | Miyakawa et al. | 180/68.3 |
| 5,708,238 A | * | 1/1998 | Asao et al. | 181/272 |
| 5,738,781 A | * | 4/1998 | Carlson | 210/170 |
| 6,454,040 B1 | * | 9/2002 | Fukuda | 180/374 |
| 6,508,329 B2 | * | 1/2003 | Maki et al. | 180/309 |
| 6,533,060 B1 | * | 3/2003 | Seto | 180/337 |
| 6,571,904 B2 | * | 6/2003 | Izumi | 180/366 |
| 6,591,935 B1 | * | 7/2003 | Petley | 180/309 |
| 6,622,806 B1 | * | 9/2003 | Matsuura | 180/68.1 |

FOREIGN PATENT DOCUMENTS

| | | |
|---|---|---|
| JP | 10-110813 | 4/1998 |
| JP | 11-011171 | 1/1999 |

* cited by examiner

Primary Examiner—Christopher P. Ellis
Assistant Examiner—Kelly E Campbell
(74) Attorney, Agent, or Firm—Finnegan, Henderson, Farabow, Garrett & Dunner, L.L.P.

(57) ABSTRACT

A cooling system for an engine transmission in a saddle type vehicle such as an all-terrain-vehicle. In one embodiment, the cooling system has an induction duct, connected to a belt case that houses a transmission, for inducting cooling air into the belt case. The system further includes a discharge duct connected to the belt case for exhausting the cooling air from the belt case, the discharge duct extending toward a rear fender of the vehicle. In addition, the system has an air exhaust aperture through which the cooling-air exits the discharge duct, the exhaust aperture located at an end of the discharge duct, the discharge duct generally forming an inverted "U" shape as viewed from a rear end of the vehicle, and the air exhaust aperture positioned so that the cooling air exiting the discharge duct does not directly strike the rear fender of the vehicle. The cooling system further has an induction box having a cooling-air induction port that allows the entrance of cooling-air into the induction box, the induction box being generally positioned in the transverse center of the vehicle, and the induction port being opened at a position near the bottom of a front fender of the vehicle.

4 Claims, 11 Drawing Sheets

COOLING SYSTEM FOR A TRANSMISSION MECHANISM

DESCRIPTION OF THE INVENTION

1. Field of the Invention

The present invention relates to a transmission cooling system for a saddle-type vehicle such as an all-terrain vehicle.

2. Background of the Invention

All-terrain vehicles have outstanding performance on pavement and also demonstrate high maneuverability under severe conditions including off-road and marshy conditions. The basic structure of this type of vehicle comprises a frame fitted with four wheels, an engine mounted thereupon, and a seat as well as a fuel tank located above. When a belt, instead of a chain, is used as the mechanism for transmitting engine output to the wheels, the temperature within the belt case rises due to friction heat, and that heat reduces the belt's durability. Thus, moving air is actively taken into the belt case to cool the belt while the vehicle is underway and it is discharged from the belt case after cooling the belt.

For example, in the cooling system of a belt-type transmission stated in the gazette of Japanese Kokai Publication Hei-10-110813, the exhaust port is connected to a space below the vehicle seat via a flexible exhaust duct and is structured so as to discharge toward the engine which is located in front. Also, in the power transmission device stated in the gazette of Japanese Kokai Publication Hei-11-11171, the exhaust duct is configured so as to enhance the transmission cooling properties. However, in these and other conventional cooling mechanisms, the exhaust duct is opened at a high point on the vehicle to avoid intaking water and other debris. Usually, the aperture of the exhaust duct is situated near the rear fender. Due to the low heat resistance of the resin material used to make the fender, this positioning of the exhaust duct may lower the endurance of the rear fender.

It is accordingly a primary object of the invention to provide a transmission cooling system that cools the belt drive without lowering the endurance of the rear fender.

This is achieved by providing a transmission cooling system that maintains high waterproof properties and demonstrates outstanding countermeasures against heat.

SUMMARY OF THE INVENTION

In accordance with the invention, there is disclosed a cooling system for a transmission in a vehicle, such as an all-terrain vehicle. In one embodiment, the cooling system has an induction duct that inducts cooling air into a belt case that houses a transmission. The system also has a discharge duct that exhausts air from the belt case. The vehicle typically has a transmission, that changes the drive-power speed of a crankshaft transmitted via a clutch at a desired speed-change ratio, installed transversely offset to one side. In such a vehicle, the aforementioned induction duct is opened at one end within a box-type induction box located generally in the transverse center of the vehicle. The induction box also has an air induction port that is opened at a position near the bottom of the front fender, while the discharge duct extends to the rear of the rear fender below the seat forming a generally "U" shape when viewed from the rear. The discharge duct opens so that the exhaust does not directly strike the rear fender.

Pursuant to the present invention, the transmission cooling system is characterized by the fact that the aperture of the discharge duct is directed toward the side of the rear fender and a plate is attached so as to cover the aperture. Furthermore, the induction duct is linked to the belt case between the clutch and the drive pulley. A cooling-air guide unit is installed near this belt case linkage facing a cooling fan that rotates with the drive pulley so as to circulate cooling air. The inner wall surface of the aperture of the discharge duct on the side of the belt case to the outside in the vehicular transverse direction is positioned at the back of the movable face on one side of a driven pulley when the transmission is at the maximum reduction ratio.

In an embodiment of the present invention, cooling air can be actively taken into the belt case by installing an induction duct and a discharge duct before and behind the transmission. In such a case, the aperture of the induction side and the aperture of the discharge side are separated from the wheels by situating them in the center transversely, thereby reliably preventing the penetration of water, mud, and other debris into the apertures. In particular, the penetration of water, mud, and other debris during the induction of cooling air is prevented by locating the aperture of the induction duct near the bottom of the front fender. Furthermore, interaction with the rear fender is minimized by locating the aperture of the discharge duct so that the exhaust does not directly strike the rear fender.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers will be used throughout the drawings to refer to the same or like parts.

Figure 1:
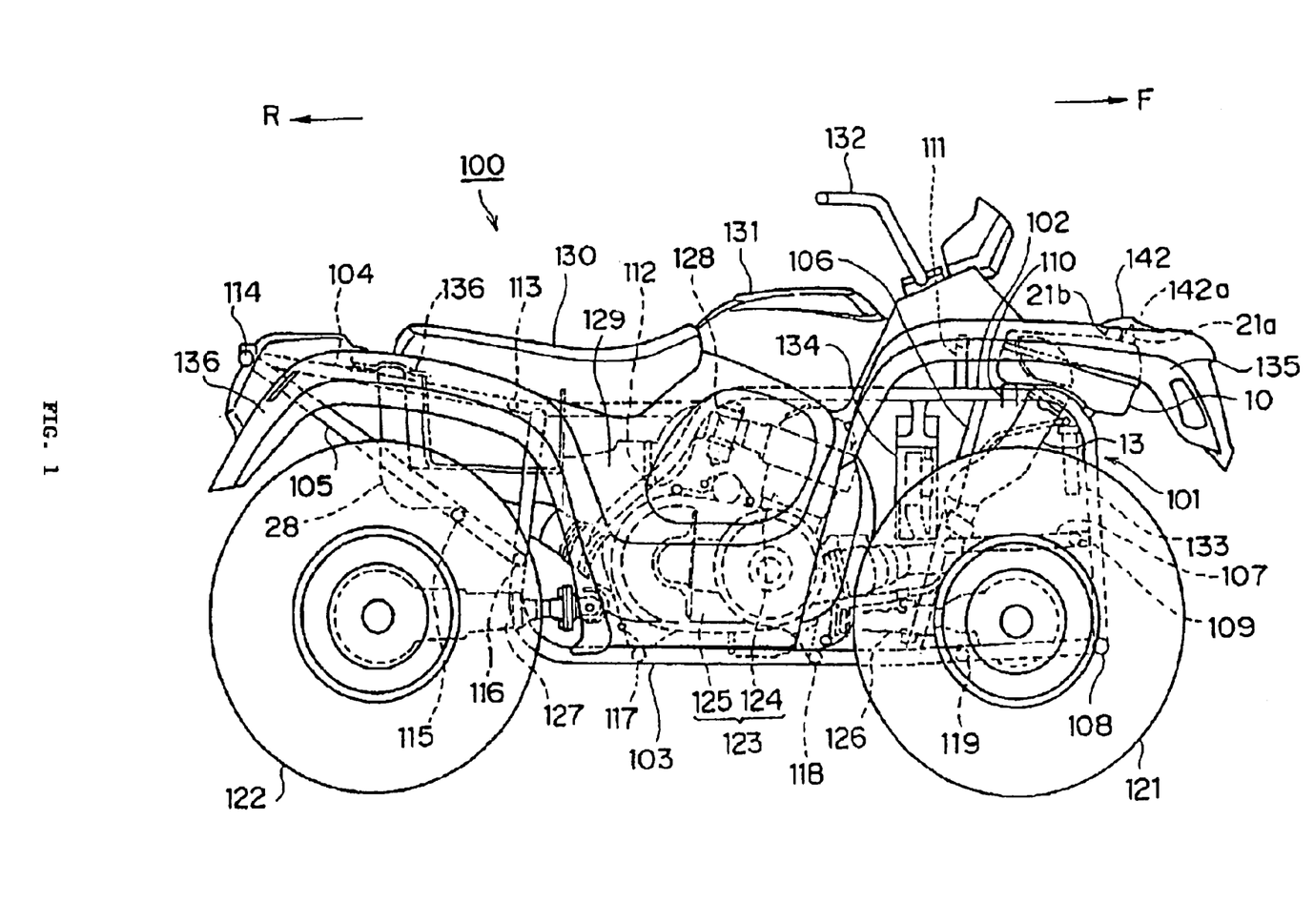
FIG. 1 is a side view of a vehicle having an embodiment of the cooling system of the present invention.
Figure 2:
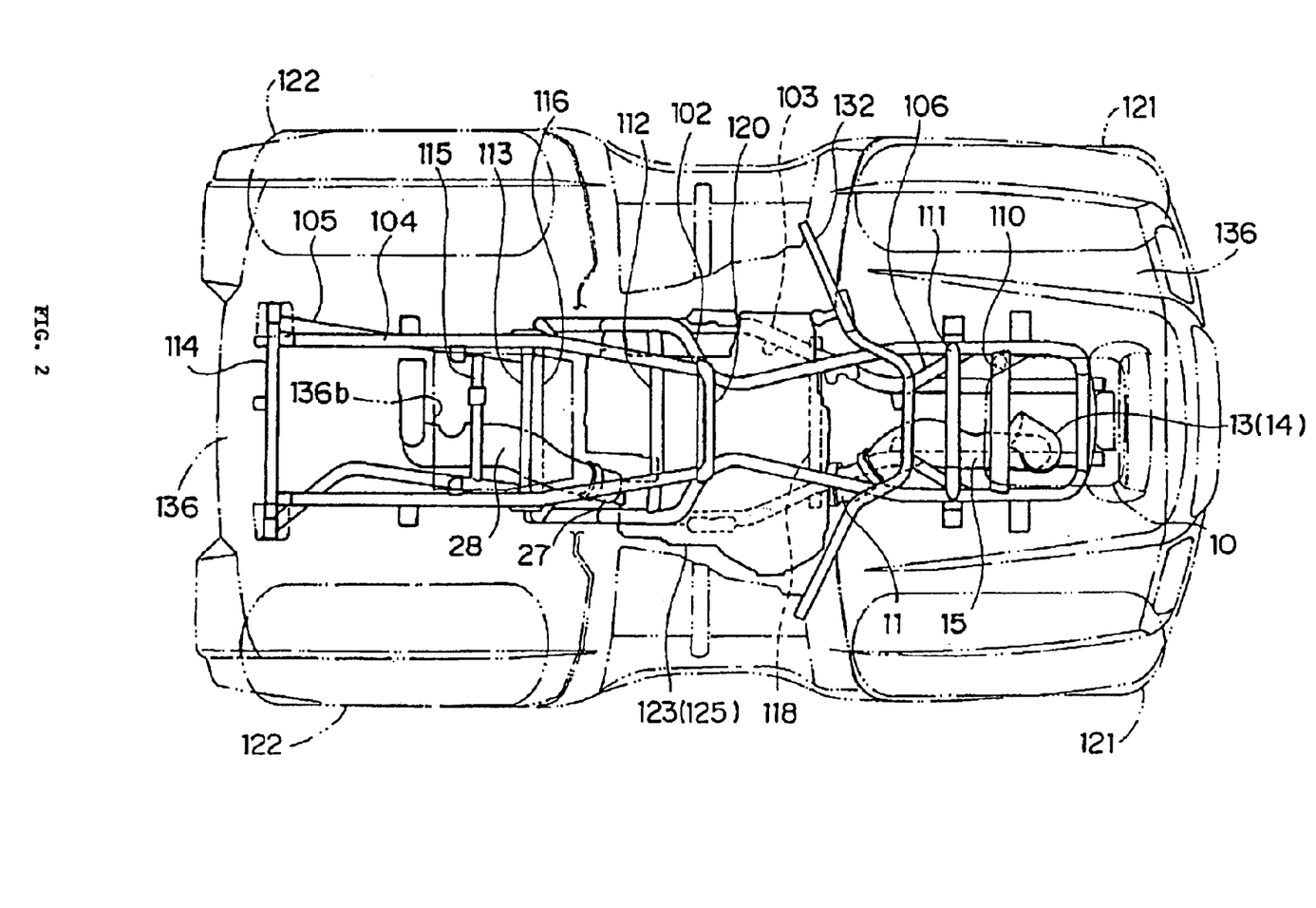
FIG. 2 is a top view of the vehicle of FIG. 1 having an embodiment of the cooling system of the present invention.

In the preferred embodiment of the present invention, the cooling system can be effectively applied to transmissions used in four-wheel saddle-type vehicles, and an embodiment is exemplified by saddle-type four-wheel vehicle 100 shown in FIG. 1. FIGS. 1 and 2 explain the overall structure of saddle-type four-wheel vehicle 100 pursuant to this embodiment. In the diagram, arrow F denotes the front while arrow R denotes the rear. Saddle-type four-wheel vehicle 100 has a body frame 101 of steel tubing. Body frame 101 is provided with a left-right pair of front upper pipes 102 and front lower pipes 103, a left-right pair of rear upper pipes 104 and rear lower pipes 105, and a left-right pair of vertical pipes 106 that connect front upper pipe 102 and front lower pipe 103 vertically. Furthermore, body frame 101 also incorporates a left-right pair of horizontal pipes 107 connecting the front of front upper pipe 102 with vertical pipe 106 in the longitudinal direction as well as a plurality of bridging members 108-120 that connect each of aforementioned pairs of members 102-107 in the transverse direction of the vehicle.

A left-right pair of front wheels 121 and rear wheels 122 are mounted at the front and rear of body frame 101 via a suspension mechanism that is not shown in the diagrams. Engine unit 123 is mounted on body frame 101 so as to be located between front-rear wheels 121 and 122. Engine unit 123 contains a four-cycle single-cylinder engine 124, for example. In addition, engine 124 is integrated with a transmission case containing belt-type transmission 125. The output of engine 124 undergoes continuously variable speed change via belt-type transmission 125, and the output is transmitted to front-rear wheels 121 and 122 via drive shaft mechanisms 126 and 127.

Carburetor 128 is connected to the intake port of engine 124. A fuel-air mixture is provided via carburetor 128. Air cleaner 129 is connected to carburetor 128. The height of engine 124 is held down by tilting the cylinder forward, and the intake port is positioned at the rear. Carburetor 128 is located at a high position relative to the intake port to form the straightest possible shape to raise the inspiration efficiency of the intake port. Saddle-type seat 130 is mounted above rear upper pipe 104 of body frame 101. Fuel tank 131 is mounted in front of that, and steering handle 132 is mounted in front of the fuel tank to steer front wheels 121. Furthermore, heat exchanger 133 (oil cooler and radiator, etc.) of engine unit 123 is mounted near the forward-most position at the front of body frame 101 extending generally above the axle of front wheels 121. Cooling fan 134 for cooling engine unit 123 is mounted behind it.

Front fender 135, covering the upper front of body frame 101 and of front wheels 121, is mounted at the front of the body, while rear fender 136, covering the upper rear of body frame 101 and of rear wheels 122, is mounted at the rear. These fenders 135 and 136 are usually made of molded synthetic resin.

Figure 3:
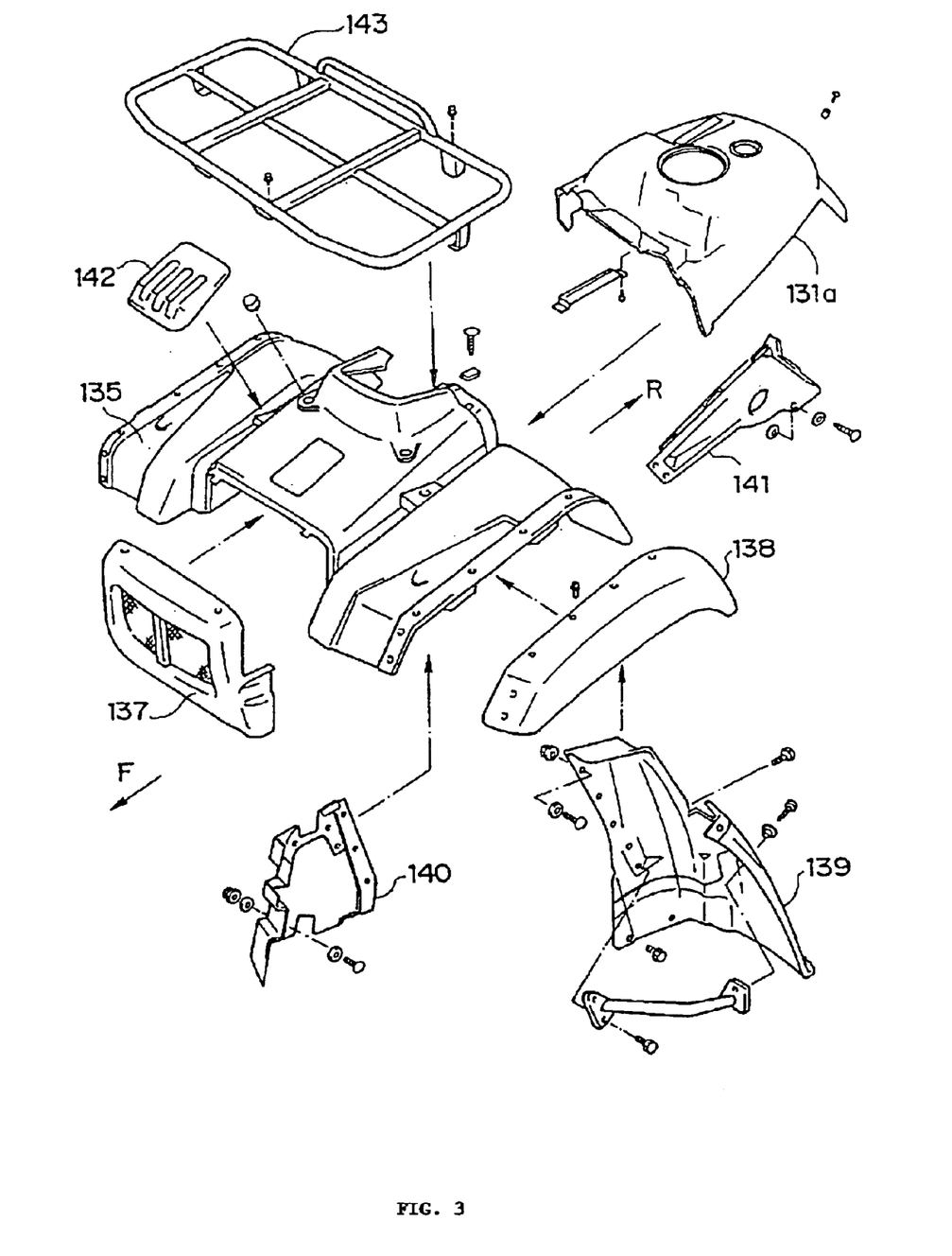
FIG. 3 is an exploded isometric view showing a front fender assembly of a vehicle having an embodiment of the cooling system of the present invention.
Figure 4:
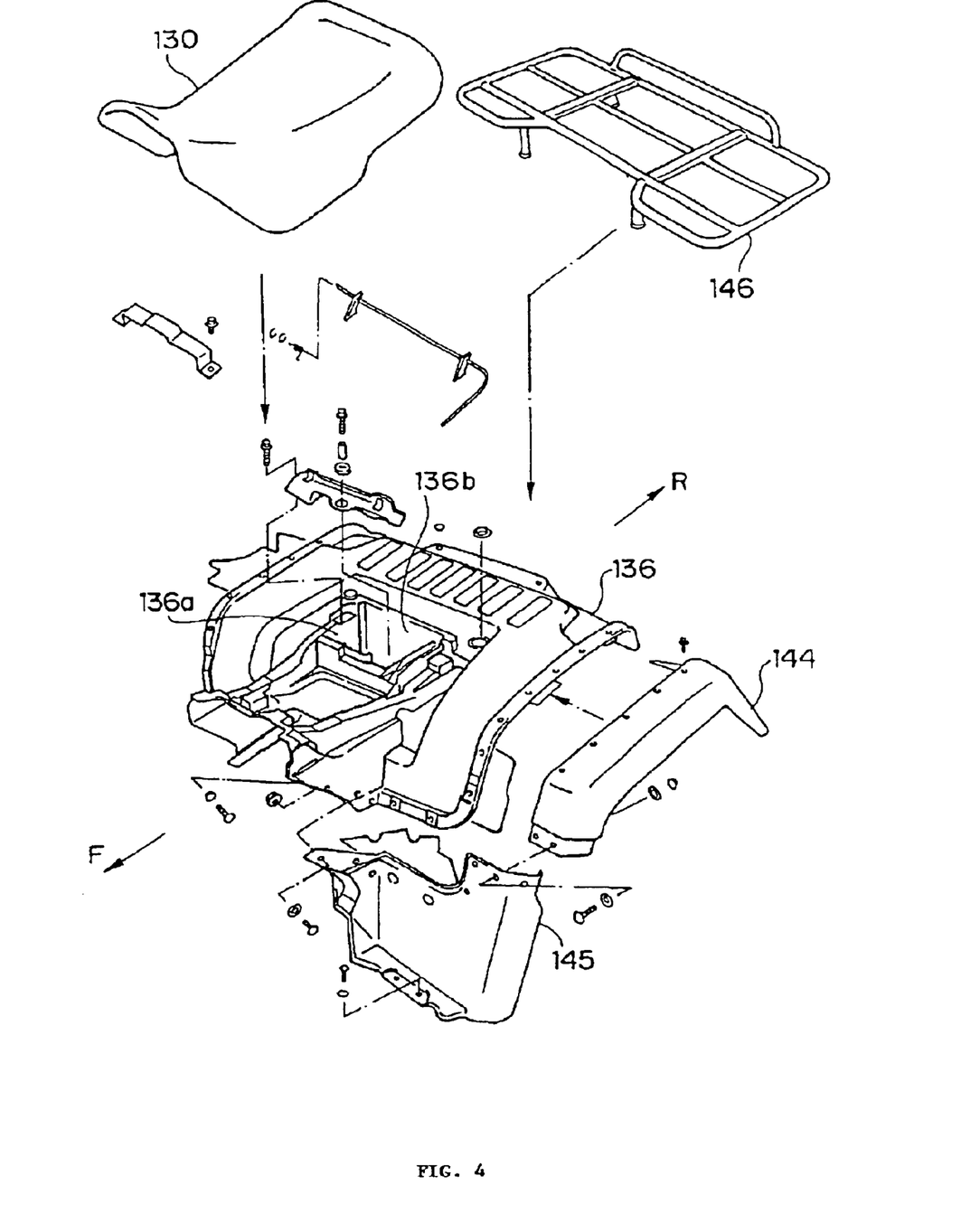
FIG. 4 is an exploded isometric view showing a rear fender assembly of a vehicle having an embodiment of the cooling system of the present invention.

FIG. 3 presents an example of the structure surrounding front fender 135. In the diagram, front central fender 137, mud guard 138, mud flap 139, inner mud flap 140, side cover 141, and lid 142 are connected to front fender 135. In addition, fuel tank cover 131a is connected at the rear of front fender 135, and front carrier 143 is optionally mounted. FIG. 4 presents an example of the structure surrounding rear fender 136. In the diagram, mud guard 144, front mud guard 145, etc., are connected to rear fender 136. In addition, seat 130 is mounted above rear fender 136, and rear carrier 146 is optionally mounted.

Figure 5:
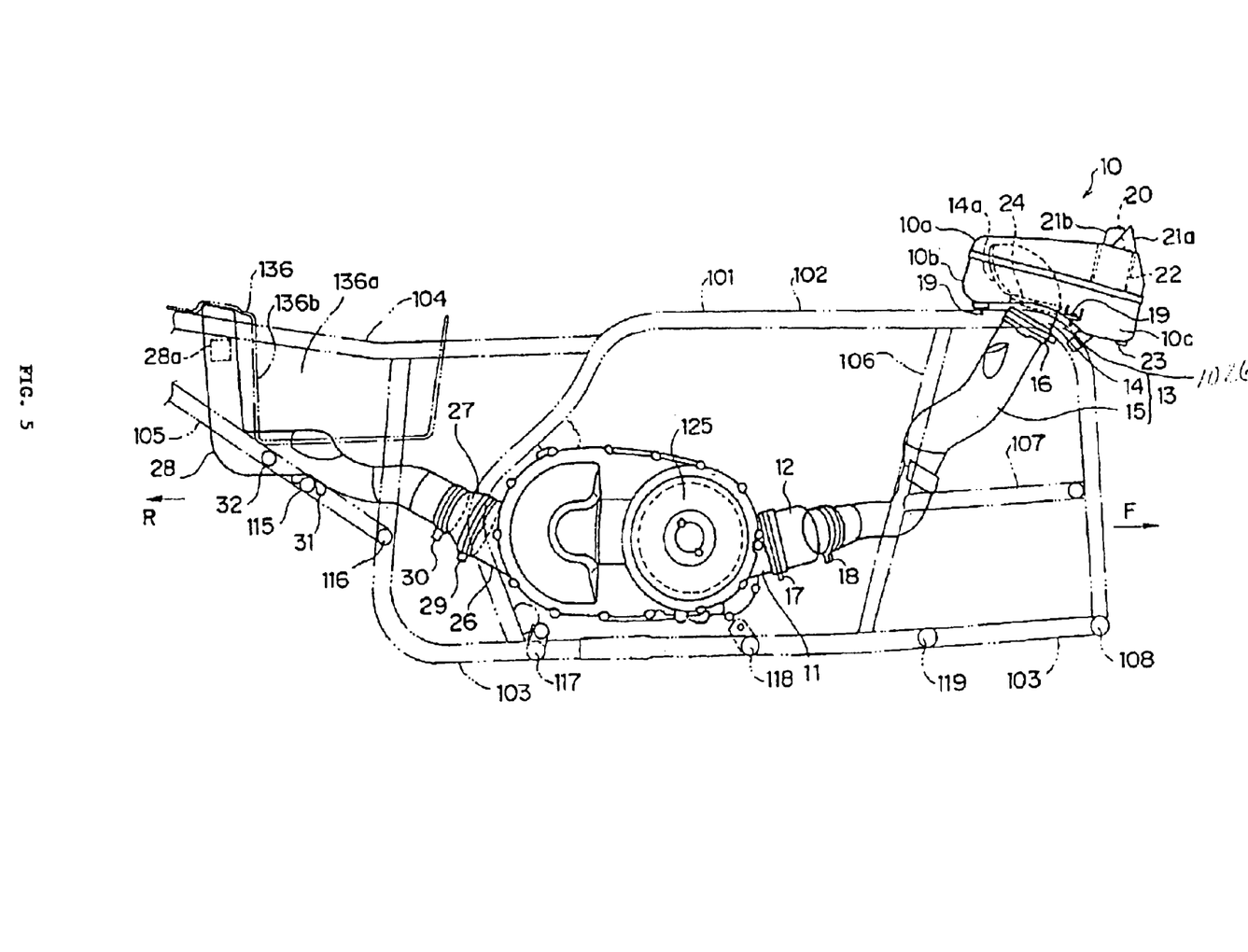
FIG. 5 is a side view showing the induction duct and discharge duct in an embodiment of the cooling system of the present invention.

In one embodiment of the transmission cooling system, shown in FIG. 5, induction box 10 made of synthetic resin is mounted between the upper front of body frame 101 and front fender 135. Induction box 10 and intake port 11 that opens at the front of belt-type transmission 125 are connected by induction duct 13 via rubber connecting pipe 12. Induction duct 13 comprises upper duct 14 and main duct 15. The two are connected by mounting band 16. Intake port 11 and connecting pipe 12 as well as connecting pipe 12 and main duct 15 are connected by mounting bands 17 and 18. Induction box 10 is a box formed from upper box 10a and lower box 10b that are fitted together air-tight. Lower box 10b is connected to the front of body frame 101 or to front upper pipe 102 by any known connections means such as nuts/bolts 19. The entire induction box 10 is positioned at the upper front of body frame 101, and is mounted at generally the center in the transverse direction of the vehicle.

Cooling air intake port 20 is set at the upper surface of induction box 10 (upper box 10a) so as to open near the lower surface of front fender 135. In a preferred embodiment, cooling air intake port 20 is oblong and has cover plates 21a, 21b attached to enclose its periphery. Guide tube 22 is formed inside of upper box 10a so as to enclose the periphery of cooling air intake port 20. Anterior downward curvature 102a is formed at the top front of body frame 101 by bending front upper pipe 102, for example. Induction box 10 is installed above anterior downward curvature 102a, and chamber 10c is formed at the lower front of induction box 10 which is sloped to match the anterior downward curvature. Aforementioned cooling air intake port 20 is mounted above chamber 10c and drain 23 is installed at the bottom-most point.

Referring to FIGS. 1 and 5, lid 142 is connected to front fender 135, and cooling air induction port 142a is formed in lid 142. Cover plates 21a and 21b surrounding the periphery of cooling air intake port 20 of induction box 10 protrude on the inside of lid 142 to allow air to flow from air induction port 142a to cooling air intake port 20. Duct coupling port 24 is opened at the lower rear of induction box 10, and upper duct 14 is fitted to duct coupling port 24 air-tight, as shown in FIG. 5. The majority of upper duct 14 protrudes inside of induction box 10 and it curves towards the rear. Aperture 14a of upper duct 14 is located in generally the transverse center of induction box 10, separated from cooling air intake port 20 and higher than the lower surface (bottom) of the induction box.

Figure 6:
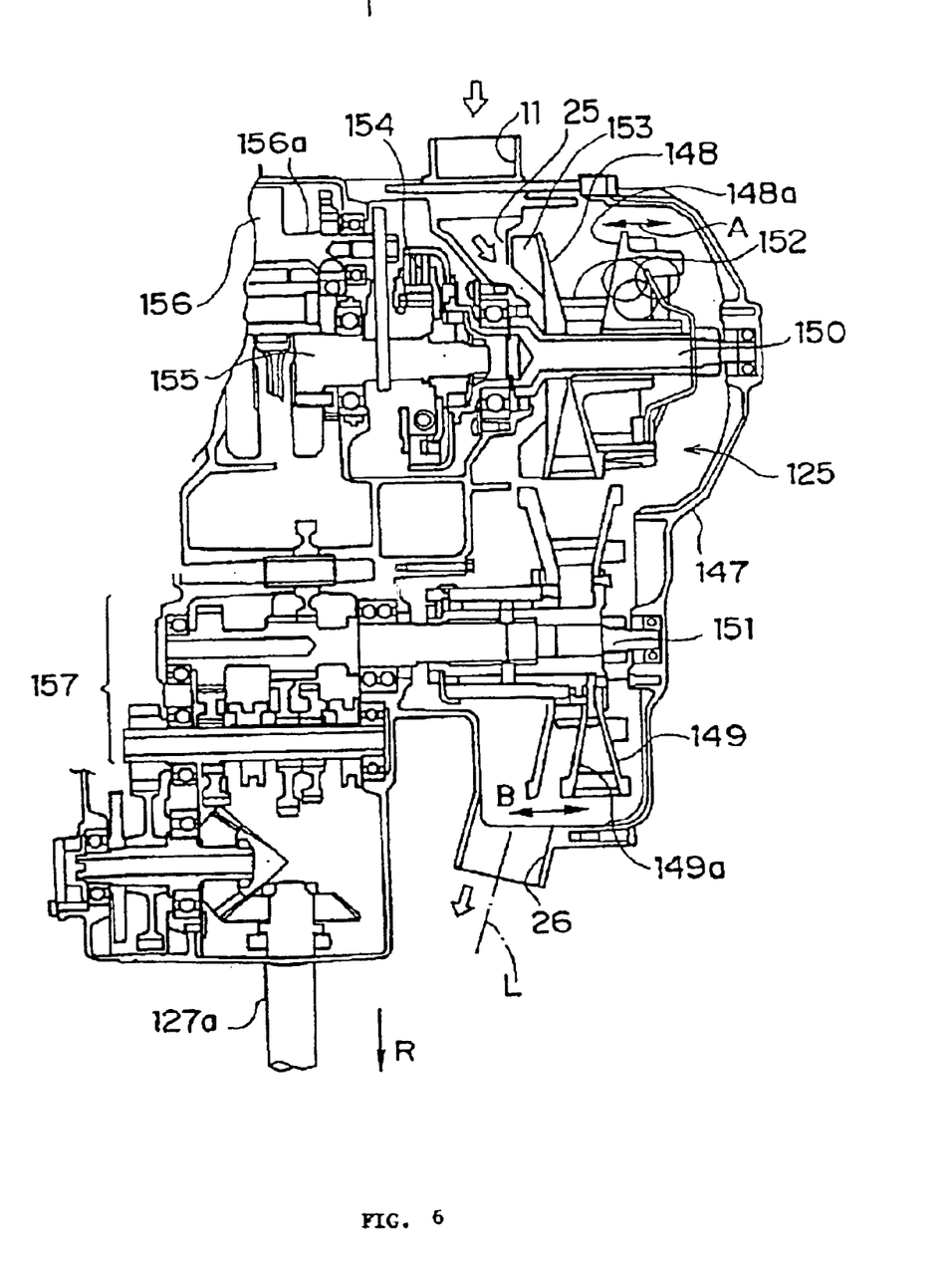
FIG. 6 is a cross-section view of a belt-type transmission in an embodiment of the cooling system of the present invention.

As shown in FIG. 1, induction duct 13 passes between heat exchanger 133 and cooling fan 134. It extends to the rear passing under cooling fan 134 and connects to intake port 11 (FIG. 5) of belt-type transmission 125. FIG. 6 presents an example of the structure of belt-type transmission 125. As mentioned above, engine unit 123 integrates engine 124 in a transmission case containing belt-type transmission 125. Belt case 147 that houses belt-type transmission 125 is located offset to one side (to the right in this example) of engine 124. Drive pulley 148 and driven pulley 149 are located to the front and back therein. Drive pulley 148 rotates around support shaft 150 while driven pulley 149 rotates around support shaft 151. Belt 152 is run between pulleys 148 and 149. The rotational force of drive pulley 148 is transmitted to driven pulley 149 via belt 152. Cooling fan 153 is integrated with drive pulley 148. Drive pulley 148 is coupled/uncoupled to crankshaft 155 of engine 124 via centrifugal clutch 154. Balancer 156 is connected to crankshaft 155 via balance shaft 156a. Driven pulley 149 is connected to speed-change gear unit 157 which, in turn, is connected to propeller shaft mechanism 127 whose propeller shaft 127a is connected to rear wheels 122.

Movable face 148a of drive pulley 148 slides along support shaft 150 (arrow A) as a function of engine speed. The radius of the span traversed by belt 152 is lengthened/shortened by reduction/expansion of the wedge width relative to belt 152. Movable face 149a of driven pulley 149 slides along support shaft 151 (arrow B) corresponding to this change, and that permits the engine rotational speed to continuously change.

Induction duct 13 is connected to intake port 11, and it links to belt case 147 between centrifugal clutch 154 and drive pulley 148 via intake port 11. Guide unit 25 for incoming air is installed on the inside of intake port 11 in the linkage with induction duct 13. Air is conducted to cooling fan 153 of drive pulley 148 via guide unit 25.

The inner wall surface of the aperture of air discharge duct 28 is positioned generally matching the back of movable face 149a on the side of driven pulley 149 when the transmission is at the maximum reduction ratio. The reduction ratio decreases as movable face 149a of driven pulley 149 in FIG. 6 slides to the left, allowing lower engine rotational speed. Specifically, the temperature within the belt case rises markedly when operating at the maximum reduction ratio, at which point the engine rotational speed rises. Therefore, the exhaust efficiency of cooling air can be raised by matching the back of movable face 149a of driven pulley 149 with the inner wall surface of exhaust port 26 on the outside in the vehicular transverse direction during periods of maximum reduction ratio.

Exhaust port 26, which opens at the rear of belt-type transmission 125, is connected via rubber connecting pipe 27 to air discharge duct 28, as shown in FIG. 5. The inner wall surface of exhaust port 26 on the outside in the vehicular transverse direction during periods of maximum reduction ratio is positioned at the back of movable face 149a while central line L of the aperture is positioned at the back of movable face 149a during periods of minimum reduction ratio (FIG. 6). Mounting bands 29 and 30 are used to connect exhaust port 26 with connecting pipe 27, and connecting pipe 27 with air discharge duct 28.

Figure 7:
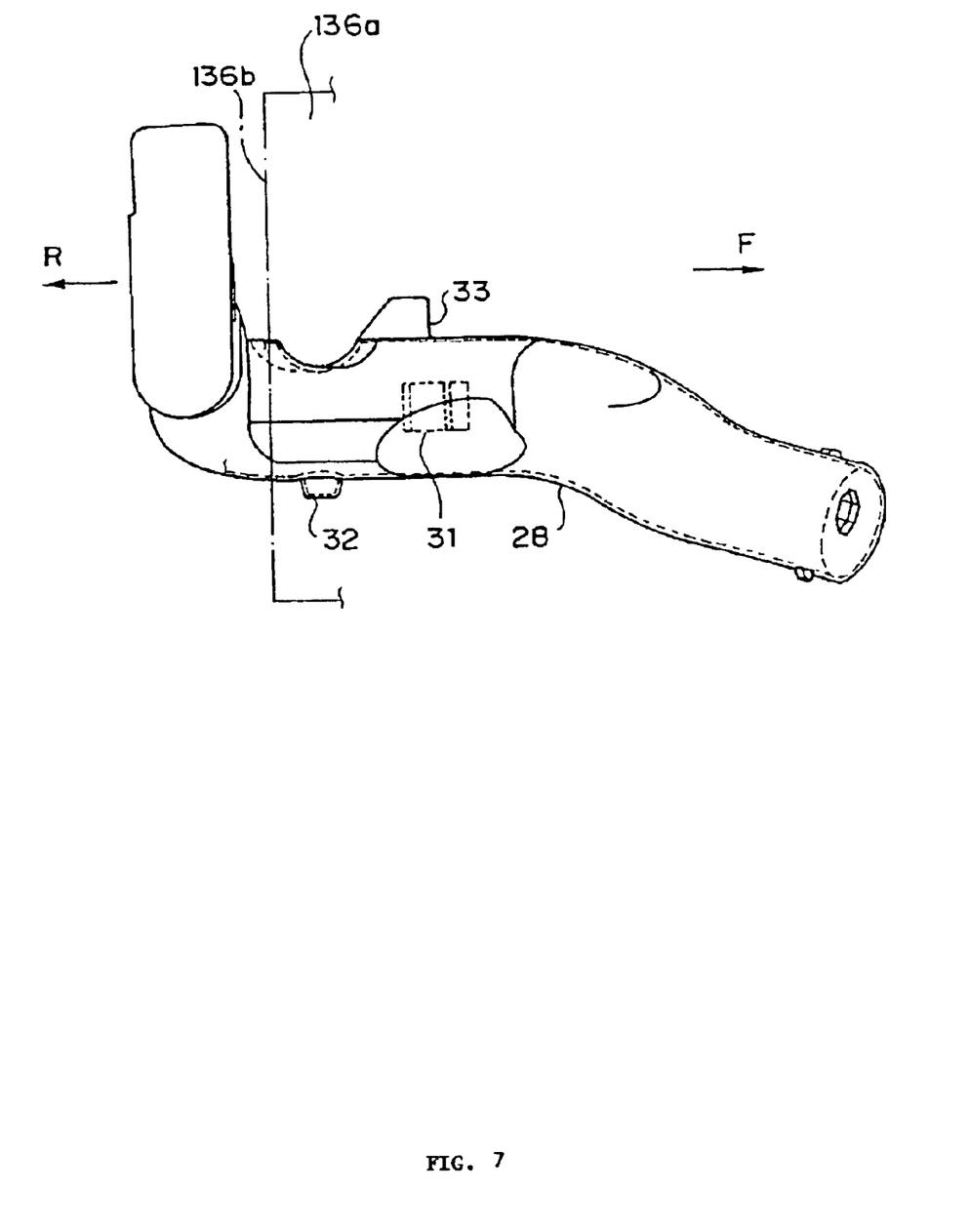
FIG. 7 is a top view of the induction duct in an embodiment of the cooling system of the present invention.

Air discharge duct 28 extends upward toward the rear from exhaust port 26, then curves upward at an acute angle near the top of the axle of rear wheels 122. It then turns to the left of the vehicle under seat 130 near its rear (FIG. 7). Air exhaust port 28a that vents outside is opened at the end of air discharge duct 28. Depression 136a is formed in generally the center of rear fender 136 situated below seat 130, as shown in FIG. 4. Air discharge duct 28 extends to the back of rear wall 136b of depression 136a, as shown in FIG. 7, and is located along rear wall 136b. A positioning means to position this section relative to body frame 101 is formed in generally the center of air discharge duct 28. This positioning means comprises engagement hook 31, contact unit 32 and engagement unit 33, as shown in FIGS. 5 and 7, for example.

Engagement hook 31 engages the outer circumferential surface of bridging member 115 in the transverse direction at the rear of body frame 101 to limit movement of air discharge duct 28 both longitudinally and downward. Contact unit 32 is positioned near the right rear of engagement hook 31 and contacts the inner surface of rear lower pipe 105 on the right side of body frame 101 to restrict movement of air discharge duct 28 to the right. Engagement unit 33 is positioned on the opposite side from contact unit 32 and engages near the bottom of depression 136a in rear fender 136 that is positioned under seat 130 to restrict movement of air discharge duct 28 upward and to the left.

Figure 8:
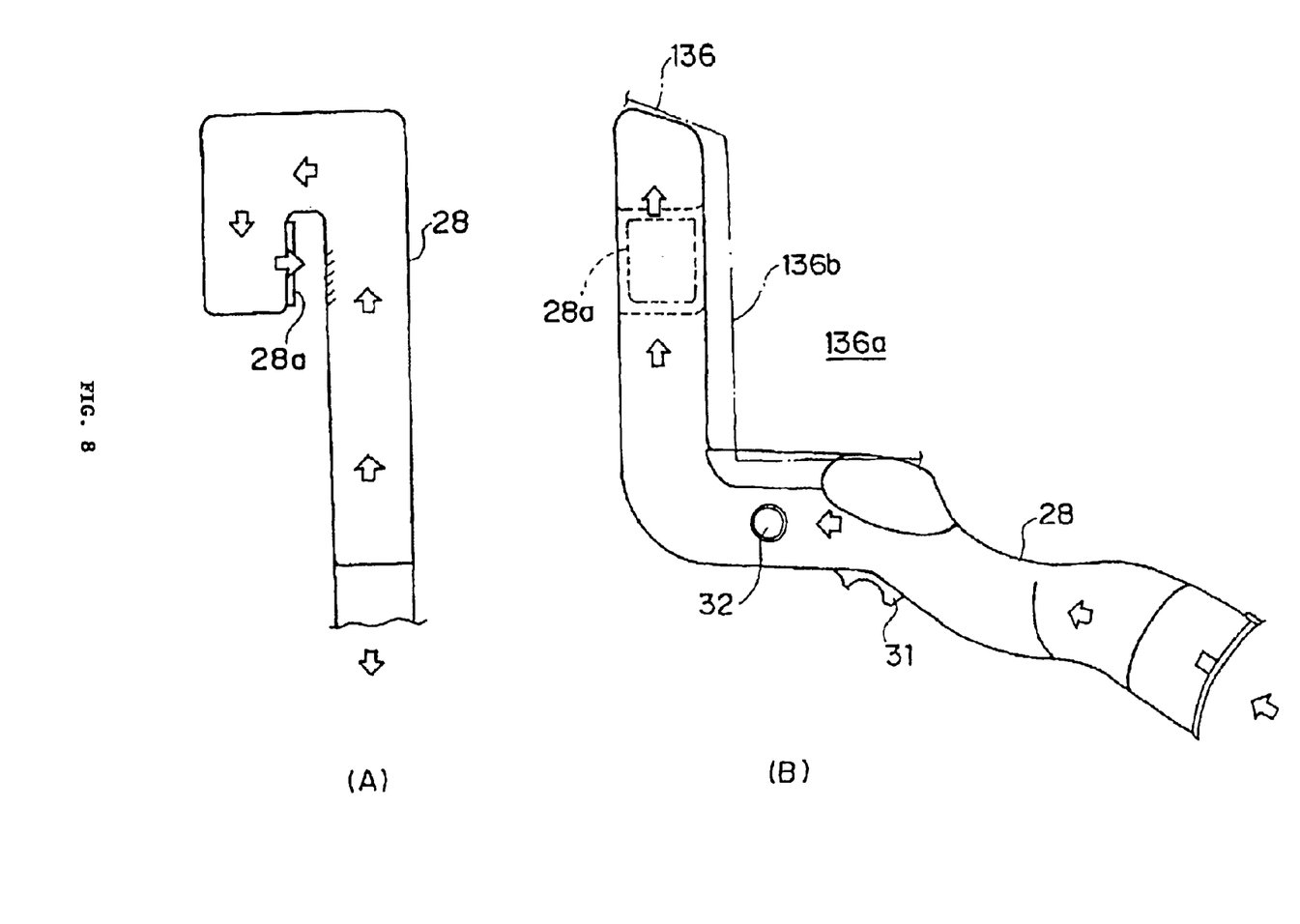
FIG. 8(A) is a rear view of the induction duct in an embodiment of the cooling system of the present invention.
FIG. 8(B) is a side view of the induction duct in an embodiment of the cooling system of the present invention.

In the preferred embodiment of the present invention, air discharge duct 28 forms an inverted "U" shape viewed from the rear, as shown in FIG. 8(A). Air exhaust port 28a (aperture) is opened so that exhaust from air discharge duct 28 at least will not directly strike rear fender 136. Air exhaust port 28a of air discharge duct 28 is directed toward the duct body in this embodiment. Specifically, air exhaust port 28a opens on the inside of the inverted "U", as shown in FIG. 8(A), and exhaust from air exhaust port 28a strikes the inner opposite side (shaded section).

A vacuum is created on the side of induction duct 13 following rotation of cooling fan 153 that rotates integrally with drive pulley 148 within belt-type transmission 125 when engine unit 123 operates. As a result, air is drawn in from air induction port 142a in front fender 135 as cooling air and passes through cooling air intake port 20 of induction box 10 into induction box 10. This cooling air then enters belt-type transmission 125 after passing through induction duct 13 and connecting pipe 12. After the cooling air has cooled the components within belt-type transmission 125, including drive pulley 148, driven pulley 149 and belt 152, it is vented outside from air exhaust port 28a after passing through connecting pipe 27 and air discharge duct 28. When the saddle-type four-wheel vehicle 100 is moving forward, the amount of cooling air supplied to belt-type transmission 125 is increased and the cooling efficiency is enhanced since the moving air is pushed into the air intake.

Induction duct 13, in a preferred embodiment of the present invention, is raised to a position near the bottom of front fender 135 where aperture 14a of upper duct 14 is positioned within induction box 10. By opening induction duct 13 in this manner, the inhalation of water or mud with cooling air is prevented. In addition, the entry of foreign matter such as water, mud or gravel that is kicked up by front wheels 121 when traveling can be effectively prevented by opening induction duct 13 at the center in the transverse direction of the vehicle. Furthermore, aperture 14a of upper duct 14 is positioned within induction box 10, and cooling air intake port 20 of induction box 10 is opened near the bottom of front fender 135, thereby hindering the inclusion of water or mud with intake air into induction box 10. In this case, the inclusion of water or mud in cooling air entering belt case 147 is hindered since aperture 14a of upper duct 14 is opened at a position vertically apart from the bottom of induction box 10.

Induction duct 13 that is mounted for this objective passes between heat exchanger 133 and cooling fan 134 as shown in a profile of the vehicle (FIG. 1). It extends to the rear passing under cooling fan 134 and connects to belt-type transmission 125. Such a long induction duct 13 is structured so as to match the shape of body frame 101. Next, cooling air that is drawn into belt case 147 from intake port 11 cools the components including drive pulley 148, driven pulley 149 and belt 152. At that time, since induction duct 13 is linked between centrifugal clutch 154 and drive pulley 148, the inner surface of belt case 147 on the side near engine 124 can also be cooled, thereby permitting temperature elevation within belt case 147 to be held down. Furthermore, cooling air is efficiently conducted to cooling fan 153 by installing guide unit 25 and it is smoothly circulated within belt case 147 to permit efficient cooling of internal components.

In addition, venting of cooling air that had been admitted in large quantities during high-speed travel can be ensured by installing exhaust port 26 so that the central line L of the aperture is positioned on the back of movable face 149a on the side of driven pulley 149 during periods of minimum reduction ratio. Air can be discharged in conjunction with movement of driven pulley 149, and a large aperture area of air discharge duct 28 can be maintained even during high engine rotational speed at low vehicular speeds when there is less cooling air by positioning the inner wall surface of exhaust port 26 on the outside in the vehicular transverse direction at the back of movable face 149a during periods of maximum reduction ratio, thereby enhancing exhaust venting. Drive pulley 148 can return to the maximum reduction ratio even when the vehicle is stopped by sudden braking from high-speed operation since centrifugal clutch 154 is located on the upstream side (side of crankshaft 155) in belt-type transmission 125 in the present invention. This provides a vehicle capable of outstanding utility and handling.

Air discharge duct 28 is raised from exhaust port 26 to the vicinity directly below the back of seat 130 and air exhaust port 28a opens in the center in the transverse direction of the vehicle. This efficiently prevents the entry of foreign matter such as water, mud or gravel that is kicked up by rear wheels 122 when traveling. In particular, this is structured so as to wrap around to the back of rear wall 136b of depression 136a positioned in generally the center of rear fender 136 where it opens, thereby hindering the entry of foreign matter. Furthermore, air discharge duct 28 is formed generally in an inverted "U" shape (FIG. 8(A)) and air exhaust port 28a is directed toward the duct body, thereby ensuring that exhaust from air discharge duct 28 does not directly contact rear fender 136.

Figure 9:
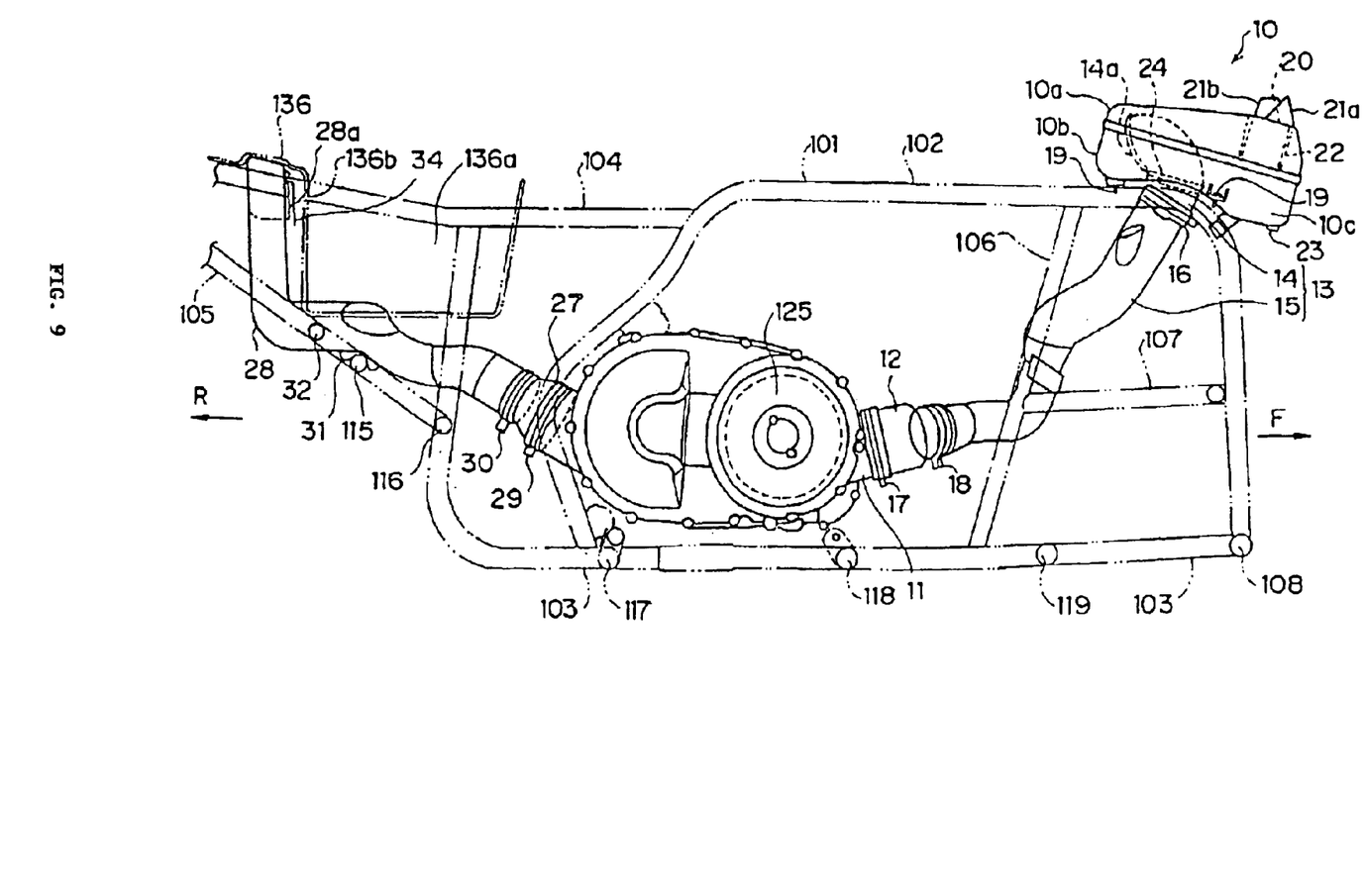
FIG. 9 is a side view showing the induction duct and discharge duct in a second embodiment of the cooling system of the present invention.
Figure 10:
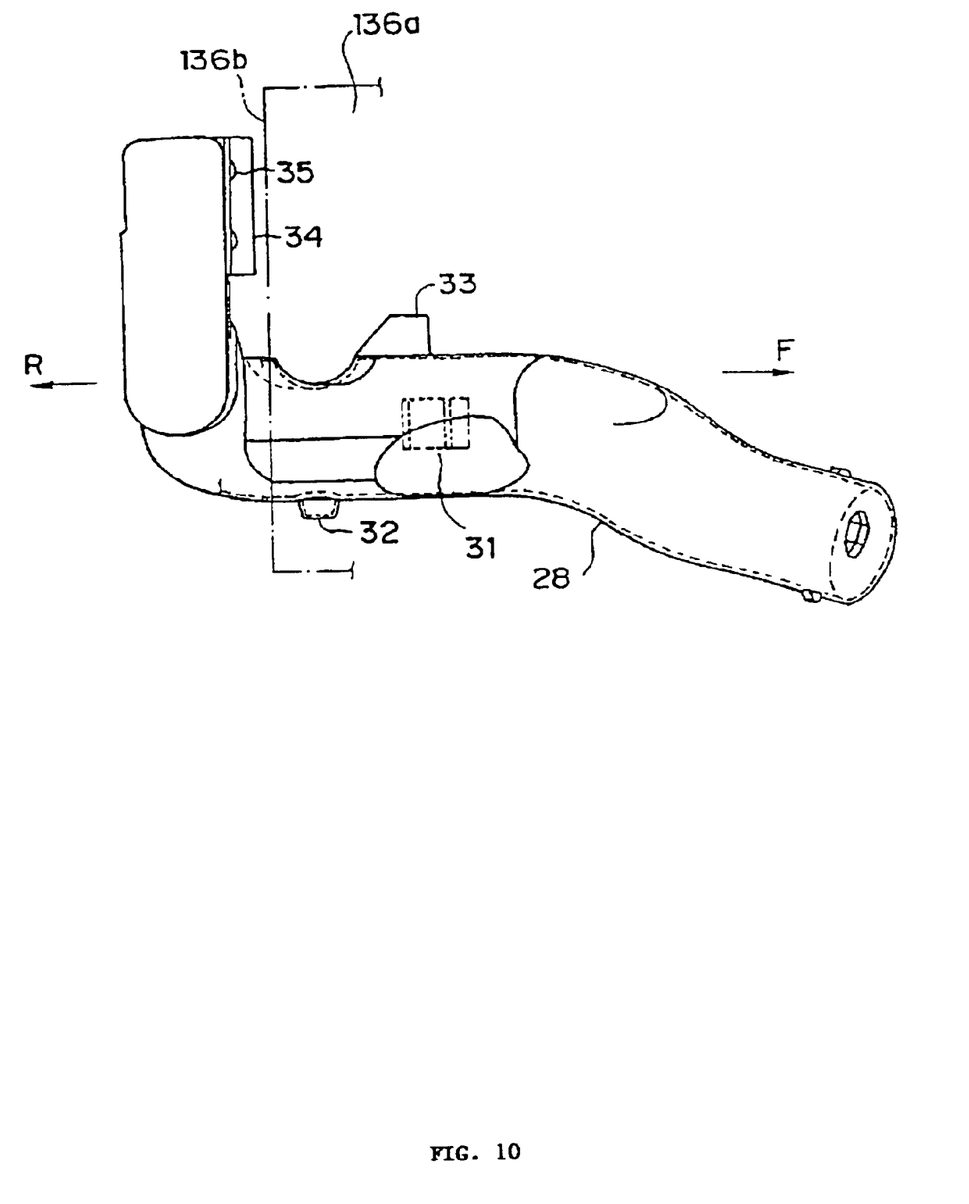
FIG. 10 is a top view showing the discharge duct in a second embodiment of the cooling system of the present invention.
Figure 11:
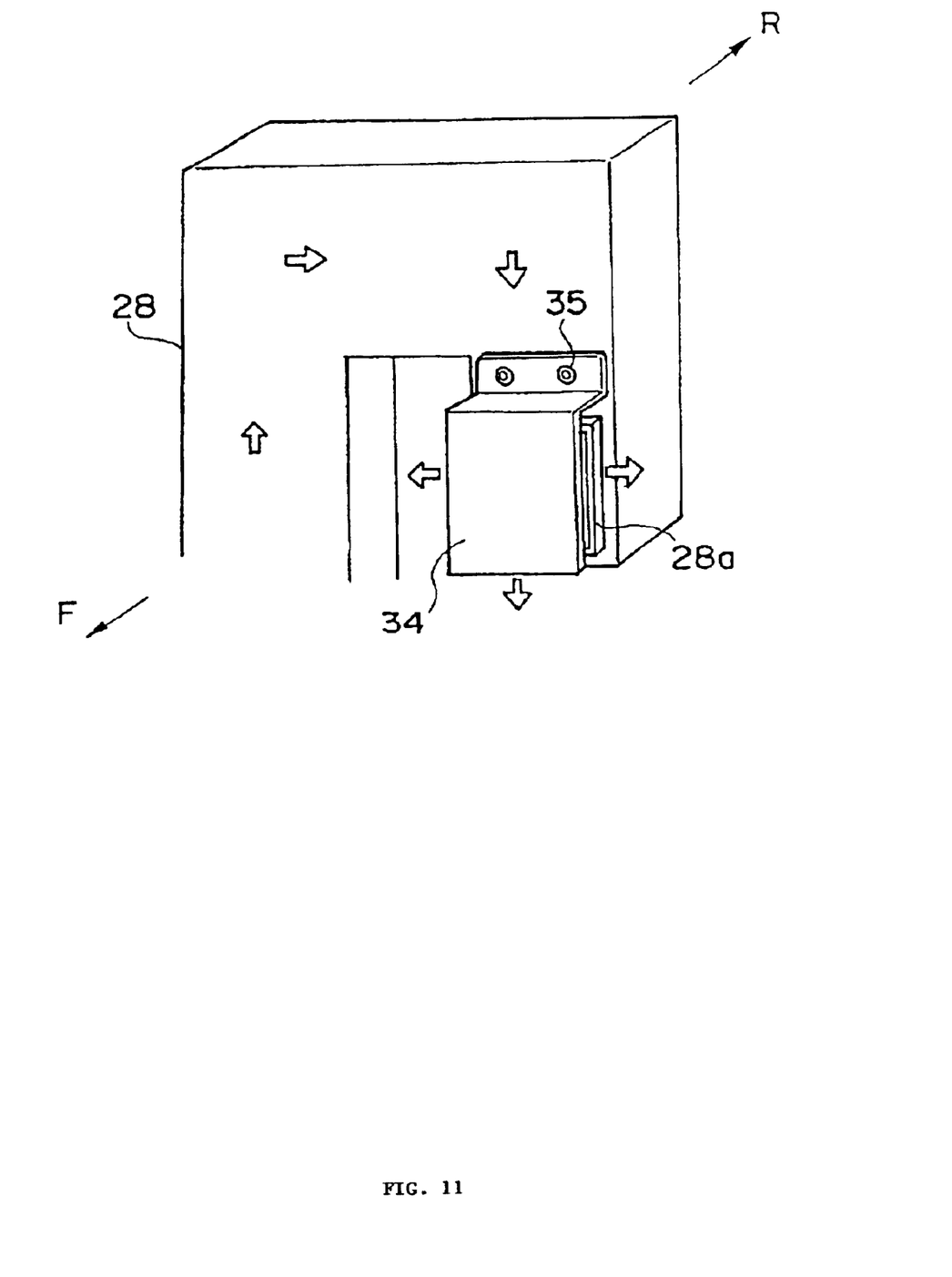
FIG. 11 is a partial isometric view showing the discharge duct in a second embodiment of the cooling system of the present invention.

In a second embodiment of the transmission cooling system, exhaust from air discharge duct 28 does not directly strike rear fender 136, but air exhaust port 28a of air discharge duct 28 is directed toward the side of rear fender 136 as shown in FIG. 9, and a thin steel plate 34 is attached in order to cover air exhaust port 28a. Air discharge duct 28 which is formed in generally in an inverted "U" shape extends to the rear of rear wall 136b of depression 136a in rear fender 136, just as in the first embodiment, and is located along said rear wall 136b, as shown in FIGS. 10 and 11. Air exhaust port 28a is opened in the front (side facing rear wall 136b) at the end of air discharge duct 28. In this example, plate 34 is fastened to air discharge duct 28 by screw 35 at the top. Plate 34 is attached to air discharge duct 28 while a suitable gap is formed along the edge of the aperture of air exhaust port 28a. Exhaust from air exhaust port 28a of air discharge duct 28 is directed transversely, as indicated by the arrows in FIG. 11, so as not to directly strike rear fender 136. Furthermore, attachment of plate 34, which covers air exhaust port 28a, hinders the entry of foreign matter such as water or mud.

While the description of the preferred embodiment, sets forth specific shapes, such as the shape of air exhaust port 28a of air discharge duct 28, the present invention is not limited to the examples presented in the diagrams. Specifically, in addition to rectangular shape, it may be suitably modified to polygonal, circular, round, oval or any other suitable shape. Furthermore, the aforementioned embodiments explained the present invention using a four-wheel buggy-type vehicle, but the present invention could provide the same effect in a three-wheel buggy-type vehicle or in other vehicles in which this type of engine is mounted.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A cooling system for an engine transmission in a vehicle comprising:

an induction duct for inducting cooling air into a belt case that houses a transmission, the induction duct having first and second ends, the second end being connected to the belt case;

a discharge duct connected to the belt case for exhausting the cooling air from the belt case, the discharge duct extending towards a rear fender of the vehicle;

an air exhaust aperture through which the cooling-air exits the discharge duct, the exhaust aperture located at an end of the discharge duct, the discharge duct generally forming an inverted "U" shape as viewed from a rear end of the vehicle, and the air exhaust aperture positioned so that the cooling air exiting the discharge duct does not directly strike the rear fender of the vehicle, wherein the air exhaust aperture opens towards the side of the rear fender, the transmission cooling system further comprising a plate at least partially covering the air exhaust aperture; and an induction box having a cooling-air reduction port that allows the entrance of cooling-air into the induction box, the first end of the induction duct being connected to an opening in the induction box, the induction box being generally positioned in the transverse center of the vehicle, and the induction port being opened at a position near the bottom of a front fender of the vehicle.

2. A cooling system for an engine transmission in a vehicle comprising:

an induction duct for inducting cooling air into a belt case that houses a transmission, the induction duct having first and second ends, the second end being connected to the belt case, wherein the induction duct is linked to the belt case between an engine clutch and an engine drive pulley;

a discharge duct connected to the belt case for exhausting the cooling air from the belt case, the discharge duct extending towards a rear fender of the vehicle;

an air exhaust aperture through which the cooling-air exits the discharge duct, the exhaust aperture located at an end of the discharge duct, the discharge duct generally forming an inverted "U" shape as viewed from a rear end of the vehicle, and the air exhaust aperture positioned so that the cooling air exiting the discharge duct does not directly strike the rear fender of the vehicle;

an induction box having a cooling-air reduction port that allows the entrance of cooling-air into the induction box, the first end of the induction duct being connected to an opening in the induction box, the induction box being generally positioned in the transverse center of the vehicle, and the induction port being opened at a position near the bottom of a front fender of the vehicle;

a cooling-air guide positioned near the link of the induction duct and the belt case, the cooling air guide facing a cooling fan that rotates with the drive pulley and circulates cooling air;

a movable face on a driven pulley that is driven by the drive pulley, the movable face moving along a support shaft as a function of the engine's rotational speed; and an exhaust port having an inner wall surface and a central line, the central line of the exhaust port positioned to face a back of the movable face when the engine transmission is at a minimum reduction ratio and the inner wall surface positioned to face the back of the movable face when the engine transmission is at a maximum reduction ratio.

3. A cooling system for an engine transmission in a vehicle comprising:

an induction duct for inducting cooling air into a belt case that houses a transmission, the induction duct having first and second ends, the second end being connected to the belt case, wherein the induction duct is linked to the belt case between an engine clutch and an engine drive pulley;

a discharge duct connected to the belt case for exhausting the cooling air from the belt case, the discharge duct extending towards a rear fender of the vehicle;

an air exhaust aperture through which the cooling-air exits the discharge duct, the exhaust aperture located at an end of the discharge duct, the discharge duct generally forming an inverted "U" shape as viewed from a rear end of the vehicle, and the air exhaust aperture positioned so that the cooling air exiting the discharge duct does not directly strike the rear fender of the vehicle, wherein the air exhaust aperture opens towards the discharge duct;

an induction box having a cooling-air reduction port that allows the entrance of cooling-air into the induction box, the first end of the induction duct being connected to an opening in the induction box, the induction box being generally positioned in the transverse center of the vehicle, and the induction port being opened at a position near the bottom of a front fender of the vehicle;

a cooling-air guide positioned near the link of the induction duct and the belt case, the cooling air guide facing a cooling fan that rotates with the drive pulley and circulates cooling air;

a movable face on a driven pulley that is driven by the drive pulley, the movable face moving along a support shaft as a function of the engine's rotational speed; and an exhaust port having an inner wall surface and a central line, the central line of the exhaust port positioned to face a back of the movable face when the engine transmission is at a minimum reduction ratio and the inner wall surface positioned to face the back of the movable face when the engine transmission is at a maximum reduction ratio.

4. A cooling system for an engine transmission in a vehicle comprising:

an induction duct for inducting cooling air into a belt case that houses a transmission, the induction duct having first and second ends, the second end being connected to the belt case, wherein the induction duct is linked to the belt case between an engine clutch and an engine drive pulley;

a discharge duct connected to the belt case for exhausting the cooling air from the belt case, the discharge duct extending towards a rear fender of the vehicle;

an air exhaust aperture through which the cooling-air exits the discharge duct, the exhaust aperture located at an end of the discharge duct the discharge duct generally forming an inverted "U" shape as viewed from a rear end of the vehicle, and the air exhaust aperture positioned so that the cooling air exiting the discharge duct does not directly strike the rear fender of the vehicle, wherein the air exhaust aperture opens towards the side of the rear fender the transmission cooling system further comprising a plate at least partially covering the air exhaust aperture;

an induction box having a cooling-air reduction port that allows the entrance of cooling-air into the induction box, the first end of the induction duct being connected to an opening in the induction box, the induction box being generally positioned in the transverse center of the vehicle, and the induction Port being opened at a position near the bottom of a front fender of the vehicle, a cooling-air guide positioned near the link of the induction duct and the belt case, the cooling air guide facing a cooling fan that rotates with the drive pulley and circulates cooling air;

a movable face on a driven pulley that is driven by the drive pulley, the movable face moving along a support shaft as a function of the engine's rotational speed; and an exhaust port having an inner wall surface and a central line, the central line of the exhaust port positioned to face a back of the movable face when the engine transmission is at a minimum reduction ratio and the inner wall surface positioned to face the back of the movable face when the engine transmission is at a maximum reduction ratio.

* * * * *